REF SIGNAL (SQUARED)

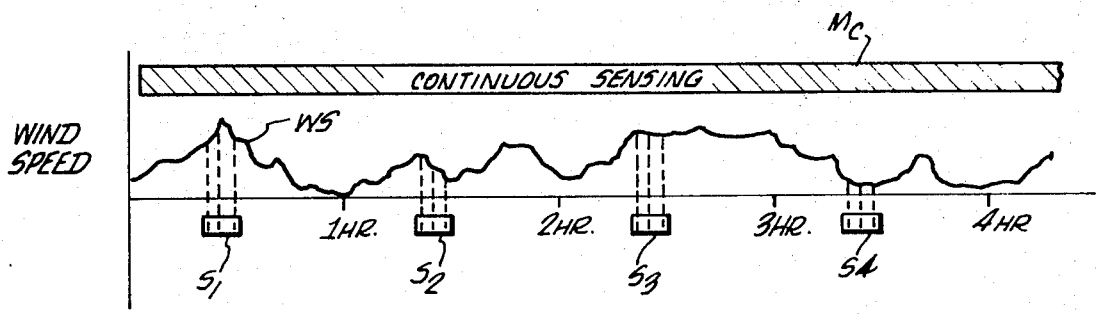
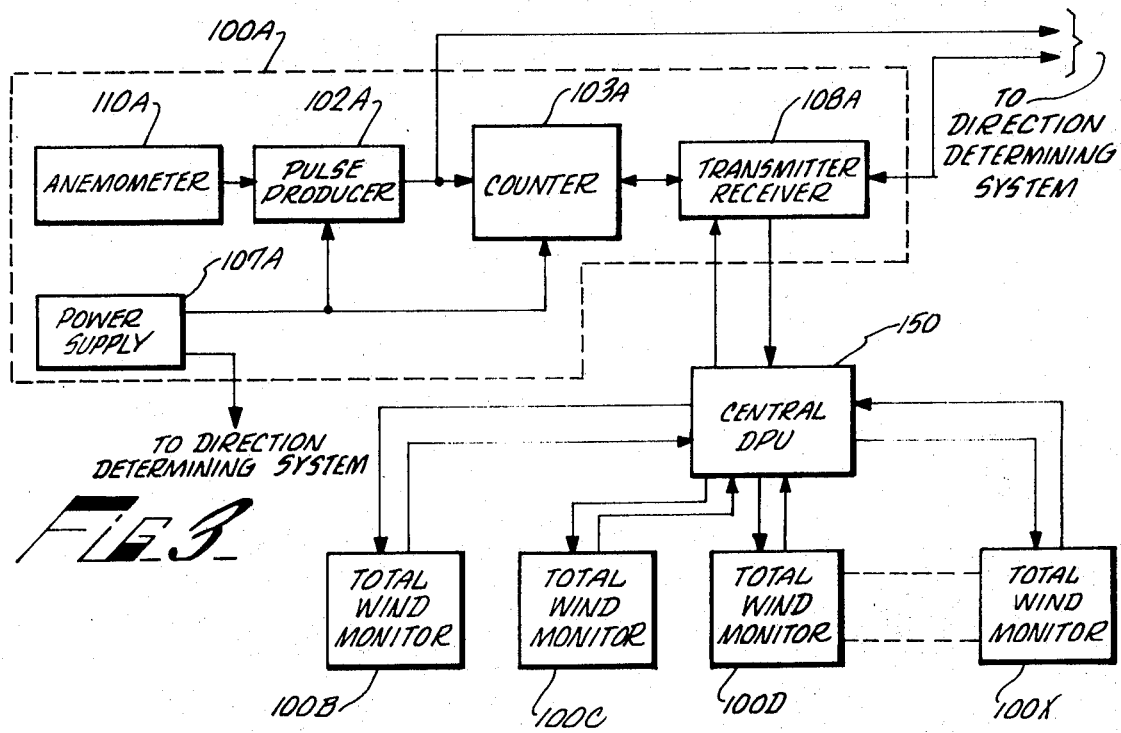

RESULTANT ROTOR SIGNAL (SQUARED) →θ←

CONTROL FLIP/FLOP OPERATING PERIOD

United States Patent Office 3,616,692
Patented Nov. 2, 1971

3,616,692
DATA ACQUISITION SYSTEM
Elbert Gerald Keller, Camarillo, Calif., assignor to Leach Corporation, South Pasadena, Calif.
Filed Sept. 8, 1969, Ser. No. 856,035
Int. Cl. G01f 13/00
U.S. Cl. 73—189
14 Claims

ABSTRACT OF THE DISCLOSURE

A low power requirement data acquisition system is disclosed. The system is adapted to continuously digitally record a sensed scaler measurement which may represent, for example, an environmental condition such as "total wind." The system is further adapted to record directional indication values correlated with the scaler measurements. Digital representations of the magnitude and directional values are stored for later transmission to a remote central processing point. The representative digital data may readily be converted to an accurate vectorial representation to provide an accurate history of the sensed vectorial events.

BACKGROUND OF THE INVENTION

(1) Field of the invention

The present invention relates to data acquisition systems and more particularly to low power requirement systems which may be used at a remote location to monitor, store and transmit data correlatable with a vectorially representable event.

(2) Description of the prior art

With the advance of man's ability to utilize environmental data to predict and control environmental events, there is an increasing requirement to obtain information concerning environmental conditions from a large number of discrete geographic locations. Often a desirable location is neither situated near a population center nor readily accessible to frequent visitation.

As a typical example, we may consider the meterologists requirements of obtaining information such as the time history of wind speed and direction from a large number of remote sensing locations.

For such remote sensing, automatic telemetering apparatus capable, over long periods of time, of monitoring, storing and transmitting information concerning environmental events such as wind speed and direction is required.

The nature of such remote monitoring systems presents inherent design requirements. Perhaps the most important consideration is that the systems must contain their own portable power supplies. Further, since the systems must operate over long periods without maintenance, the average power requirements of the systems must be small in relation to the total available power so as to maximize the maintenance free life of the systems. In addition, since such systems must often be transported long distances over difficult terrain for installation, they must be of portable size.

The paramount requirement, of course, is that the systems be capable of providing data having the information content required. In the case of a system designed to monitor vectorially representative events such as wind conditions, the data must contain both magnitude and directional information.

Magnitude information, while a necessary component in the determination of total air movement, is also of interest by itself. For example, the "total wind" moving past a given point, regardless of direction, is correlatable with such factors as the dryness of a forest. This is so since forest dryness is related to the rate of moisture evaporation, which in turn is related to average wind speed. In many other instances, a time history of magnitude values alone is significant.

Known systems generate such "total wind" data by periodically discretely sampling wind speed, averaging the sample values obtained and multiplying by the total elapsed time. For example, one known typical system monitors wind speed for ten minute periods out of every hour. A plurality of discrete samples are taken during the ten minute monitoring period. The sample values thus obtained are averaged to approximate a ten minute "average" value. The ten minute "average" is assumed to be a fair representation of the average wind speed in the remainder of the hour. "Total wind" over the hour period is obtained by simply multiplying by six.

Such systems obviously introduce inherent inaccuracies since the ten minute "average" wind reading does not necessarily correctly reflect wind conditions for the remaining fifty minutes of each hour. Further, the technique of obtaining discrete samples of wind speed at a given instant of time, may introduce additional errors if Nyquist's sampling criteria are not satisfied. Nyquist's criteria dictates that samples must be taken at least at twice the frequency rate of the highest frequency component of the information signal or the system will be subject to so-called "aliasing" errors.

The requirement of determining directional information and relating such information to the magnitude components also introduces difficulties. Since by its very nature an angle measurement is discontinuous at 0° and 360°, there is an inherent indeterminacy introduced in an angle measuring system. That is, if a sample is taken as the angle measuring device passes this discontinuity, the measured reading may generally take any arbitrary value. Typically, known systems provide direction measurements by attaching a circularly configured resistive pot having a sweep arm connected to a directional sensing component such as a directional vane indicator. Known systems have attempted to solve the discontinuity problem by providing a plural pot system having discontinuities oriented at various angular values. By providing complicated switching networks, these systems switch from one pot to another before a discontinuity area is reached in any one pot. While such approaches do eliminate the discontinuity problem, they are costly, cumbersome and complicated.

An additional difficulty in determining directional information experienced by prior art systems, evolves from the prior art sampling techniques. Known systems take direction measurements only during discrete sampling times. Therefore, resort to some "angle averaging" technique is mandatory. During periods of environmental turbulence, such an approach can result in gross errors since the averaged direction value obtained during discrete sampling periods generally will not accurately reflect the overall time history conditions.

It is, therefore, desirable to provide a low power, lightweight, simple, inexpensive telemetry system to accurately monitor, record and transmit magnitude and directional information.

SUMMARY OF THE INVENTION

In accordance with the present invention, a data acquisition system is provided which overcomes the abovenoted difficulties. The acquired data is stored for selective transmission from a remote environmental sensor location to any desired utilization point. The data acquisition system, with minor modifications, may be used in combination with any sensors capable of providing magnitude and/or directional indications.

The data acquisition system of the present invention includes a quantizer for emitting a plurality of output pulses one each corresponding to equal incremental values of the time integral of the magnitude signal delivered by the sensor. The output pulses are stored for selective transmission to a utilization point.

A second quantizer is responsive to each time integral magnitude representing pulse and emits digital signals corresponding to the instantaneous angle value of the directional signal delivered by the sensor. The output from the second quantizer is supplied to an approximator which provides digital output signals corresponding to the linearly approximated value of the sine and cosine, respectively, of the instantaneous angle value. These approximations are also stored for selective transmission to a utilization point.

The system is powered only for short intervals responsive to each magnitude representing pulse. Once the magnitude pulse is stored and the sine and cosine approximation signals are generated and stored, the system power is turned off until the next succeeding magnitude pulse. Overall system power requirements are therefore minimized.

BRIEF DESCRIPTION OF THE DRAWING

FIG. 1 is a typical wind speed versus time graph illustrating the conceptual approach of the prior art and that of the present invention;

FIG. 3 is a block diagram of a plural remote magnitude determining telemetry system constructed in accordance with the principles of the present invention;

DESCRIPTION OF THE PREFERRED EMBODIMENT

Figure 5:
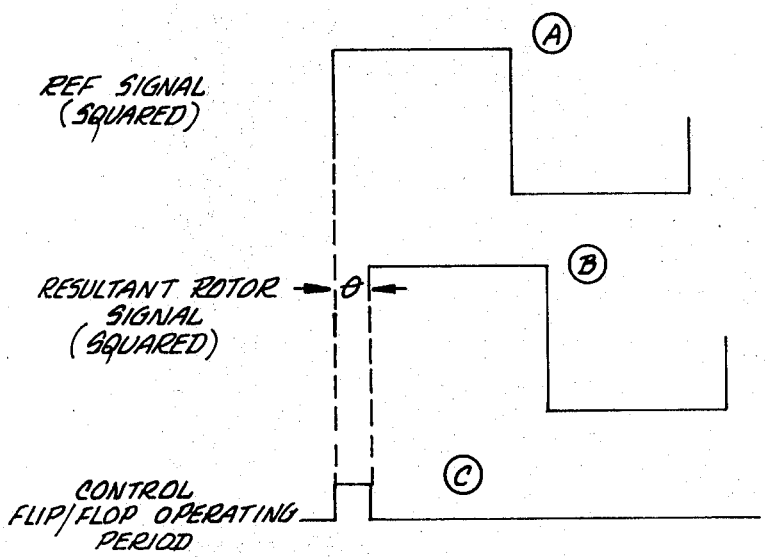
FIG. 5 is a waveform chart useful in understanding the operation of the apparatus of FIG. 4.

Referring now to FIG. 1, there is shown a waveform WS corresponding to an exemplary continuous four-hour representation of instantaneous wind speed at a monitoring location. Although the ensuing discussion will relate to a system for monitoring wind speed and direction, the principles involved are equally applicable to any magnitude and/or directionally representable phenomena.

The first step in obtaining vector information is to obtain magnitude component values. The waveform WS in FIG. 1 represents a time history representation of variations of the scalar quantity, wind speed.

FIG. 1 illustrates the distinction between the approach taken by prior art systems and that taken by the instant invention. Prior systems, due to their high operating power requirements during "active" periods, generally adopt a periodic sampling technique. This is illustrated by the four sampling periods $S_1$–$S_4$ indicated below the waveform WS in FIG. 1.

Typically, such prior art systems actually monitored wind speed for only a fractional segment of each time period such as an hour. This segment might typically be ten minutes out of each hour as represented in FIG. 1. During these monitoring segments, a plurality of discrete sample measurements are taken. Three discrete samples per sampling period ($S_1$–$S_4$) are illustrated in FIG. 1. The prior art systems thereafter average the discrete values obtained during each sampling segment to obtain a segment average value (ten-minute average). This average value is then multiplied by the ratio of the total monitoring period (one hour) to the sampling period (ten minutes) to derive an estimation of the "total wind" experienced during each hour.

Monitoring for only a fraction of the total elapsed time does serve to cut down on power consumption. However, as may be appreciated by reference to FIG. 1, the values obtained are not accurately representative of the total experienced phenomena. During periods of turbulence, wherein wide fluctuations of wind speed are experienced at the sensing location, large errors are introduced. Now these errors can be reduced by increasing the sampling time to twenty minutes or thirty minutes or more. This results, however, in significantly increasing the overall power requirements, thus limiting the maintenance-free life of the remote system.

Increasing the sampling period alone may not be enough to correct error accumulation problems. In addition, as above discussed, it is necessary to insure that the discrete samples occur at a frequency sufficient to satisfy Nyquist's sampling criteria.

The computing system of the present invention completely overcomes all of the above difficulties. As illustrated by the continuous sensing bar $M_c$ appearing above waveform WS in FIG. 1, the present system continuously monitors wind speed. Since the monitoring is continuous, no averaging is required. Further Nyquist's criteria are inherently satisfied since in effect the continuous sensing corresponds to an infinite number of infinitely close discrete samples.

An important feature of the present invention involves the technique for obtaining and retaining the sensed information. As will become apparent, the apparatus of the present invention is capable of a continuous monitoring operation with minimum power requirements.

Figure 2:
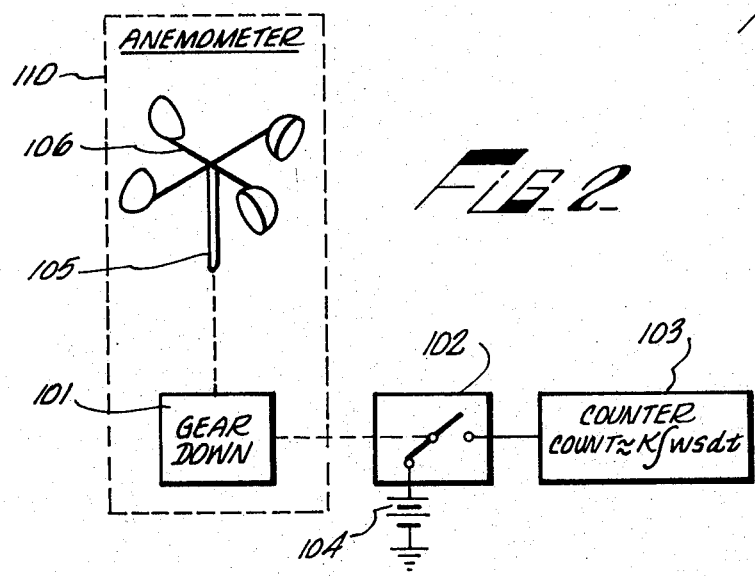
FIG. 2 is a block diagram of the magnitude determining portion of the present invention.

Referring now to FIG. 2, a block diagram of the "total wind" monitoring and computing apparatus is illustrated. Show in FIG. 2 is an anemometer 100 which comprises a shaft 105 driven by a standard wind speed sensing plural cup configuration 106. As is well-known, cup configuration 106 is responsive to air motion (wind) in the plane of the cup supports. The shaft 105 is connected to a gear down arrangement 101 which has an output gear (not shown) of a lower angular velocity than the drive shaft 105. The output gear is in turn adapted to close and open a contact switch 102 at repetitive equal angle increments of its rotational movement.

The closing of switch 102 completes a circuit from battery 104 to counter 103, which has the effect of providing a current pulse to pulse counter 103. This operation is repeated each time the output gear from gear down mechanism 101 rotates through a predetermined angular distance. The pulse count in 103 at any given time represents the total angular movement of the output gear of gear down mechanism 101 and therefore the total angular movement of shaft 105. The value in counter 103, therefore, is a function of the total "wind distance" past the anemometer location. The system allows for continuous monitoring of wind speed. No power is consumed except for the power required to provide the pulses to counter 103. The gear down mechanism may be fabricated to provide any convenient gear down ratio. For example, one pulse may be provided for every 528 feet of air movement (wind) past the anemometer location. Ten pulses, therefore, represent one mile of wind movement past the anemometer location.

Referring now to FIG. 3, there is shown a plurality of remote "total wind" monitors 100A to 100X. The remote "total wind" monitors are positioned to continuously monitor and provide a central data processing unit 150 with data related to the total wind passing a plurality of remote monitoring locations. Only monitor 100A is shown in detail. The remaining monitors would be identical.

Referring to monitor 100A, an anemometer 110A activates pulse producer 102A. Pulse producer 102A in conjunction with power supply 107A provides pulses to a counter 103A in the manner previously described with respect to FIG. 2. A centrally located central data processing unit 150 provides an interrogate counter command to the receiver portion of a transmitter-receiver 108A. Transmitter-receiver 108A interrogates counter 103A and transmits the interrogated count via its transmitter portion to data processing unit 150. The technique for remotely interrogating a counter via a transmitter-receiver unit is well-known and need not be detailed here. The transmitted count, as previously described, is related to the time integral of the wind speed at the remote monitoring location. The remaining remote monitoring units 100B–100X operate in an identical fashion.

The counter preferably is fabricated from permanent storage elements such as magnetic cores. Magnetic cores can store indefinitely the count information at zero power levels. Power is only required during a "read" or "write" operation. The power supply, therefore, need only operate for extremely short intervals over an extended monitoring period. Further, since the count information is continuously available in the counters within the various remote storage units, the units may be interrogated sequentially with power for each remote unit required only for short intervals. This is important since sequential interrogation allows the use of only a single telemeter band. Prior systems, in distinction, required power in all remote locations to be on continuously for single band sequential interrogation since a lack of permanent storage ability resulted in a loss of information once system power was turned off.

Figure 4:
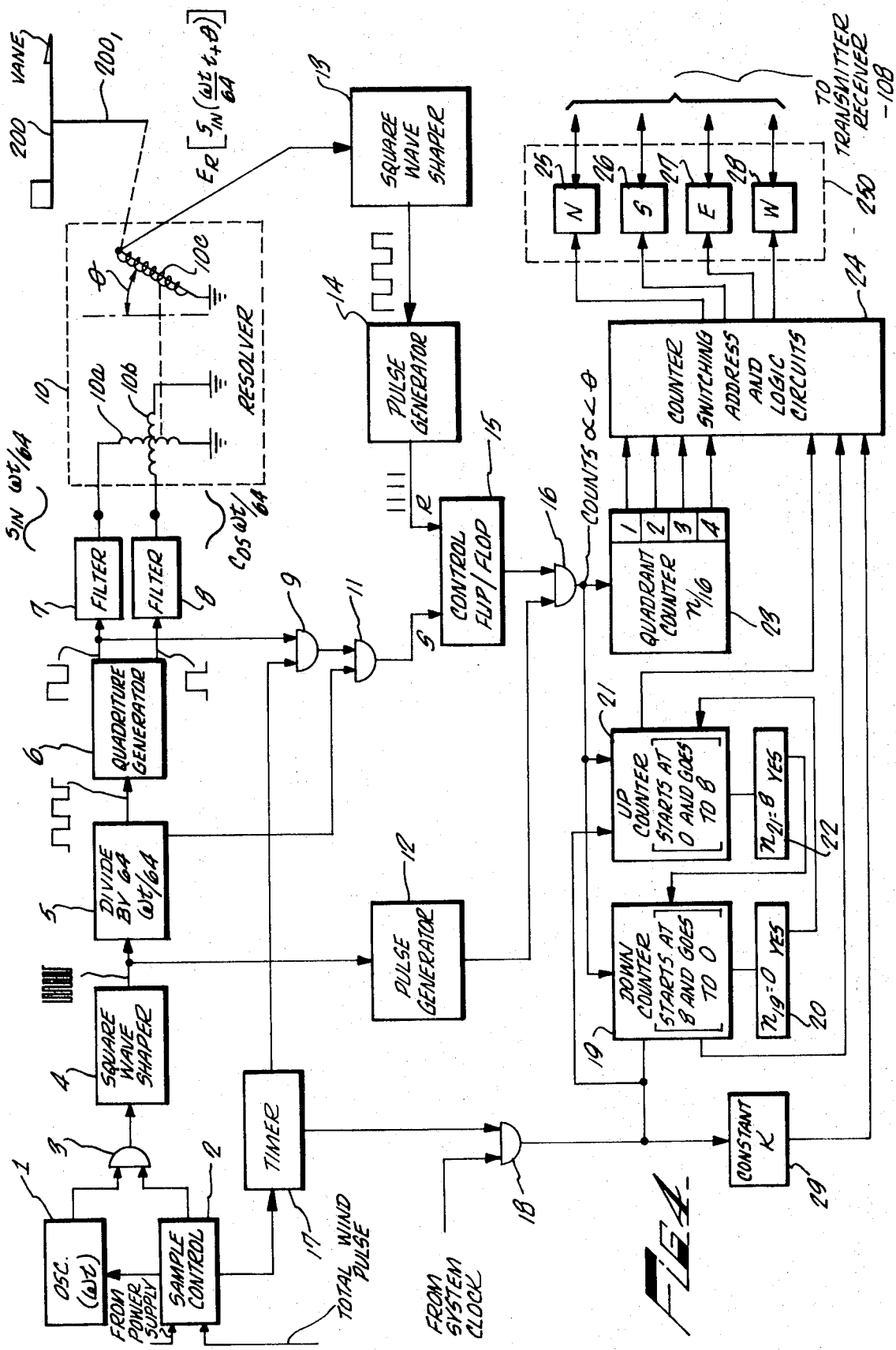
FIG. 4 is a block diagram of the directional determining system constructed in accordance with the principles of the present invention.

Referring now to FIG. 4, there is shown a functional block diagram of the directional monitoring and computing apparatus of the present invention.

As is shown in FIG. 4, a high frequency oscillator 1 provides an oscillator signal at frequency $wt$ to an AND gate 3. Sample control device 2 provides the other input to AND gate 3. The sample control 2 is enabled by the "total wind" pulse derived from the pulse producer 102 of the total wind monitor. The sample control 2 directs the turning on and ultimately the turning off of the directional monitoring apparatus.

Upon receipt of each "total wind" pulse, the sample control 2 initiates oscillator 1 and enables AND gate 3 which when thus enabled allows the oscillator signal to start its process through the system. A square-wave shaper 4 receives the transmitted oscillator signal and shapes it to a squarewave configuration. A divide by 64 circuit 5 receives the square-wave shaper output and provides one cycle output waveform for every 64 cycles of input waveform. A quadrature generator 6 receives the output from divider 5 and provides 2 distinct square-wave outputs separated in phase by 90°. The outputs from the quadrature generator are converted to corresponding sine waves by filters 7 and 8 respectively, which outputs are also separated by 90° in phase, as shown. The quadrature windings 10a and 10b of a two phase resolver 10 receives the outputs from filters 7 and 8 respectively. A standard directional vane indicator 200 has its angle shaft 200₁ mechanically coupled to the rotor 10c of resolver 10. The output signal appearing across the rotor 10c at any given instant will be of the form:

$$E_{10c}=E_R\text{SIN}(wt/64+\Theta) \qquad (1)$$

where $\Theta$ is the mechanical angle between the rotor winding 10c and the stator winding 10a which is used as a reference.

The output from the rotor 10c is applied to square wave shaper 13 which converts the rotor output signal into a square-wave configuration. A pulse generator 14 receives the output of square-wave shaper 13. Pulse generator 14 provides an output pulse for each negative to positive transition of the input square wave. The output pulses thus produced serve as reset pulses to a control flip-flop 15. The set pulses to control flip-flop 15 are derived from a reference output from quadrature generator 6 via AND gates 9 and 11. When enabled, in a manner to be hereinafter described, the output from quadrature generator 6 sets control flip-flop 15. The first pulse from pulse generator 14 serves to reset flip-flop 15.

Referring briefly now to FIG. 5, waveform A represents the squared reference signal which after filtering is applied to the reference stator winding 10a. Waveform B corresponds to the squared resultant rotor signal. The time of occurrence between the negative to positive transition of waveform A and that of waveform B corresponds to $\Theta$ which as previously mentioned is related to the rotor (and therefore the vane) angle.

Referring again to FIG. 4, the time of occurrence between each set and reset pulse into control flip-flop 15 is proportional to the angle $\Theta$. Control flip-flop 15 when set provides an output to enable an AND gate 16. The other input to AND gate 16 is derived from a pulse generator 12. Pulse generator 12 receives the output from square-wave shaper 4 and produces pulses (at frequency $wt$) corresponding to each negative to positive transition of the square-wave output of shaper 4.

It is to be noted that the resolver output and the remainder of the electronic circuits are in synchronism; that is, the signals used to determine the mechanical angle related pulse width are in synchronism with the driving waveforms on the stator windings. Consequently, the number of pulses appearing on the output of AND gate 16 (which AND gate is controlled by flip-flop 15) will vary from 0–64 depending upon the value of the angle $\Theta$.

It is necessary to allow the oscillator, the divider circuits, quadrature generator and the filters to operate for a reasonable period of time subsequent to being energized to insure that all system transients have decayed. This function is performed by timer 17. Timer 17 is controlled by sample control 2 and after a predetermined time sufficient to allow all system transients to decay, timer 17 provides an enabling signal to AND gate 9. It is to be noted that the leading edge of the output square-wave form divider circuit 5 will be synchronized with the leading edge of one of the quadrature signals from quadrature generator 6. The first leading edge from divider circuit 5 therefore subsequent to the timer enabling signal provided to AND gate 9 is used to enable AND gate 11 which, when enabled, provides the set pulse for counter flip-flop 15.

The output from AND gate 16, as previously mentioned, consists of a plurality of pulses which will vary in count from 0–64 as a function of the angle $\Theta$ at the time of occurrence of each "total wind" pulse.

Since each "total wind" pulse represents a predetermined "quantized" magnitude quantity, the time history vector summation may be completely determined by representing each quantized value by its directed sine and cosine components. This is so since, as is well-known, a vectorial representation may be determined by a simple summation of orthogonal vector components. It is necessary, therefore, to determine the value of the sine and cosine of each angle $\Theta$ for each "total wind" pulse and summatively record these values as north, south, east and west vector components. These recorded values may thereafter be telemetered to the central processing unit 150, FIG. 3. The central processing unit thereafter readily determines the resultant vector angle from the equation $$\Theta_R=\tan^{-1}\left(\frac{N-S}{E-W}\right) \qquad (2)$$

where N, S, E, W, are the north, south, east and west vector component sum values respectively.

Figure 6:
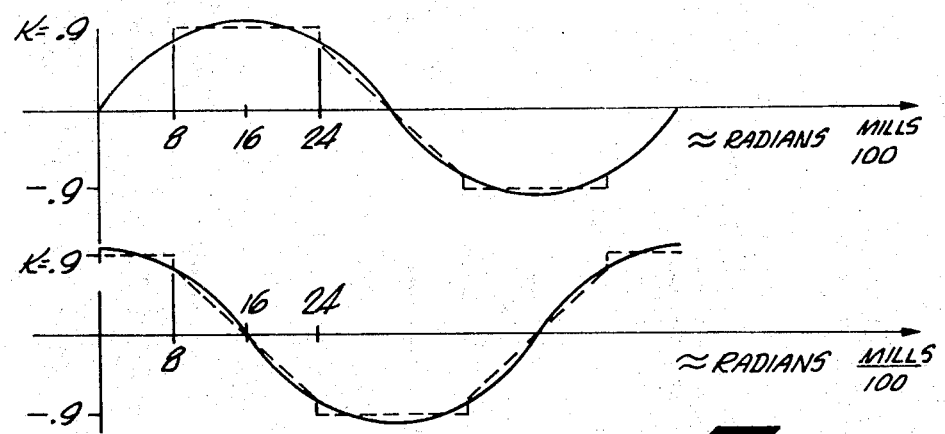
FIG. 6 is a waveform chart useful in understanding the angle approximation technique of the present invention.

Referring briefly to FIG. 6, the sine and cosine value estimation technique of the present invention is graphically illustrated. Shown in FIG. 6 is a sine curve and a cosine curve each represented for a 360° interval. It is known that, for small angles, the angle and the sine of the angle are approximately equal when the angle is measured in radians. Therefore, the present invention uses a single straight line approximation for the sine of the angle $\Theta$ from $\Theta=0$ to $\Theta=.8$ radians. Since there are, as above described, 64 counts available for a 360° excursion of the angle $\Theta$, a ready means for determining the radian value is provided by approximating the radians in mils; that is, 360° is represented by 6400 mils. Each angle representing pulse, therefore, represents 100 mils. 1600 mils, or 16 angle pulses, therefore, represents 90°.

The value of the sine of $\Theta$ from $\Theta=900$ mils to $\Theta=1600$ mils is approximated by the single constant of .9. As shown by FIG. 6, the value of the cosine may therefore be taken as simply the complement of the above sine values: that is, from $\Theta=0$ to $\Theta=900$ mils, the value of the cosine of $\Theta$ may be approximated by the constant .9; from $\Theta=900$ mils to $\Theta=1600$ mils, the value of the cosine of $\Theta$ may be represented by a straight line approximation complementing that of the sine value approximation from $\Theta=0$ to $\Theta=800$ mils.

The approximation technique of the present invention is graphically represented by the dashed lines superimposed on the waveforms of FIG. 6.

It should be noted that the individual sine and cosine approximation values may individually vary from the correct value by as much as 10%. However, it has been found that with the above approximation technique, the value of the angle $\Theta$ as determined from the equation $$\Theta = \tan^{-1}\left(\frac{N-S}{E-W}\right)$$

is in error by no more than $\pm 2°$ for any value of $\Theta$ from $\Theta=0$ to $\Theta=360°$.

Turning once again to FIG. 4, the angle representing pulse count from AND gate 16 is applied to a quadrant counter 23. The quadrant counter 23 determines which quadrant the angle $\Theta$ is in; that is, the first, second, third or fourth quadrant. The quadrant determination is necessary since obviously the signs of the sine and cosine values vary as a function of which quadrant the angle $\Theta$ is in.

The outputs from quadrant counter 23 control a counter switching address and logic circuit 24 which inter alia determines which of a plurality of four component counters 25–28 will receive the final output information.

The angle representing pulse output from gate 16 is also fed as an input to an up counter 21 and a down counter 19. Up counter 21 provides the increasing approximation ramp function value from 0–800 miles (count of 0 to 8). The value of the complementary waveform is as above described approximated by the constant $K=.9$. The constant K is available from constant value provider 29.

A count determinator 22 determines when the count in up counter 21 has reached 8. When the count reaches 8, it provides an enabling pulse to down counter 19 which causes the down counter to count from 8–10 in response to pulses from AND gate 16. Down counter 19 provides the decreasing approximation ramp function. The value of the complementary waveform to the decreasing ramp function is, as above described, approximated by the constant $K=.9$.

A zero count determinator 20 determines when the down counter 19 has reached a "zero" count and thereafter provides an enabling pulse to up counter 21 which has been reset to zero. The above described process is thereafter repeated until all the angle pulses have been counted. The resultant counter values and the constant K signal thereafter are strobed into the counter switching address and logic circuit 24 by a clock pulse derived via AND gate 18. The clock pulse is derived from a system clock generally available in systems of the kind disclosed. The AND gate 18 is enabled by a pulse from timer 17 which provides the enabling pulse after the counters have received the resultant count from one complete angle sampling period.

The counter switching address and logic circuit 24 therefore is provided, for each magnitude pulse, with information relating to both the quadrant of angle $\Theta$ and the approximate values for the directed sine and cosine of the angle $\Theta$.

Circuit 24 thereafter reads the approximated directed sine and cosine values into the appropriate north, south, east and west counters 25–28 contained in the vector component storage location 250. These values may thereafter, upon an interrogation command from the central data processing unit 150, FIG. 3, be supplied to transmitter receiver 108 for transmittal to the central data processing unit.

It should be noted that the angle determining operation is effected for each magnitude representing pulse from pulse producer 102, FIG. 3. The angle measured is the angle at the magnitude pulse time. If the sensing angle does not vary significantly during the period between each magnitude pulse, the angle information provides an accurate representation of the experienced vector phenomena. For operation during turbulent conditions, however, the orientation angle may rapidly vary. Any desired accuracy may be obtained, however, by simply increasing the magnitude pulse rate or, in other words, decreasing the quantized value required to initiate each magnitude pulse.

There has thus been described an accurate low power requirement data acquisition system capable of providing more accurate information than any heretofore known system.

What is claimed is:

1. In a telemetry system including an environmental sensor adapted to provide a first output signal which varies as a function of the instantaneous magnitude of a sensed phenomena and a second output signal which varies as a function of the instantaneous direction of a sensed phenomena, a data acquisition system comprising:
   first quantizing means for generating magnitude representing output pulses one each corresponding to equal incremental values of the time integral of said first output signal;
   storage means for storing said output pulses;
   second quantizing means responsive to each magnitude representing output pulse and said second output signal for generating a second plurality of pulses, the number of which correspond to the angle value of said second output signal at the time of occurrence of each magnitude representing output pulse; and
   approximation means responsive to said second plurality of pulses for generating first and second approximation signals, said first aproximation signal corresponding to the value of the linearly approximated sine of said angle value, said second approximation signal corresponding to the value of the linearly approximated cosine of said angle value.

2. The system of claim 1 further comprising:
   means for storing said first and second approximation signals.

3. The system of claim 2 further comprising:
   means for selectively transmitting said stored output pulses and said stored approximation signals to a remote location.

4. The system of claim 2 wherein said system includes a source of power normally disconnected from the remainder of said system said system further comprising:
   means for connecting said source of power to the remainder of said system for short intervals sufficient to generate and store said magnitude representing pulses and said first and second approximation signals.

5. The system of claim 4 further comprising:
   means for disconnecting said source of power from the remainder of said system at the termination of each of said short intervals.

6. In a system including an environmental sensor adapted to provide an output signal which varies as a function of the angle orientation of a sensed phenomena, a data acquisition system comprising:

a quantizer for generating pulses the number of which correspond to the angle value of said output signal at a preselected time; and approximation means responsive to said pulses for generating a first and second approximation signal, said first approximation signal corresponding to the value of the linearly approximated sine of said angle value, said second approximation signal corresponding to the value of the linearly approximated cosine of said angle value.

7. The data acquisition system of claim 6 further comprising:

means for storing said first and second approximation signals.

8. The data acquisition system of claim 6 wherein said sensor includes a rotatable direction vane indicator having a rotatable output shaft, the rotated position of said output shaft corresponding to the angle orientation of the sensed phenomena, said quantizer comprising:

a source of reference signals;

a resolver having a stator and a rotor, said reference signals being applied to said stator, said resolver rotor being mechanically connected to said rotatable output shaft so as to be rotated thereby, the resolver rotor being arranged to provide rotor output signals having a phase related to the phase of said reference signals and varying as a function of the rotated position of said direction vane output shaft.

9. The data acquisition system of claim 8 wherein said quantizer further comprises:

means responsive to the phase of said reference signals and the phase of said rotor output signals for producing said angle value representing pulses, the number of which correspond to the difference of said phases, whereby the number of said pulses corresponds to the rotated angular position of said rotatable output shaft.

10. The data acquisition system of claim 9 wherein said means for generating said first approximation signal comprises.

means for generating a first component signal which linearly varies as a function of the number of said pulses for predetermined pulse number ranges representing predetermined angle ranges of said rotatable output shaft; and means for generating a second component signal which is equal to a predetermined constant for predetermined pulse number ranges representing those angle ranges not included in the angle ranges encompassed by said first component signal generating means.

11. The data acquisition system of claim 10 wherein said means for generating said second approximation signal comprises:

means for generating third and fourth component signals, said third and fourth component signals being the complement of said first and second component signals respectively.

12. The data acquisition system of claim 11 further comprising:

means for storing those of the component signals which correspond to the rotated angular position of said shaft at said preselected time.

13. The data acquisition system of claim 12 wherein said first component signal is equal to said angle value as expressed in radians for small angle values.

14. The data acquisition system of claim 13 wherein the value of said second component signal is approximately equal to .9.

References Cited

UNITED STATES PATENTS

| | | | |
|---|---|---|---|
| 2,191,955 | 2/1940 | Chappell et al. | 73—189 |
| 3,139,521 | 6/1964 | Johnson, Jr. | 235—167 X |
| 3,434,132 | 3/1969 | Smith et al. | 340—198 |
| 3,501,758 | 3/1970 | James et al. | 340—198 |

JERRY W. MYRACLE, Primary Examiner

U.S. Cl. X.R.

340—266